Dec. 13, 1932.      G. TASMAN      1,890,704
VEHICLE BODY
Original Filed Jan. 13, 1925     2 Sheets-Sheet 1
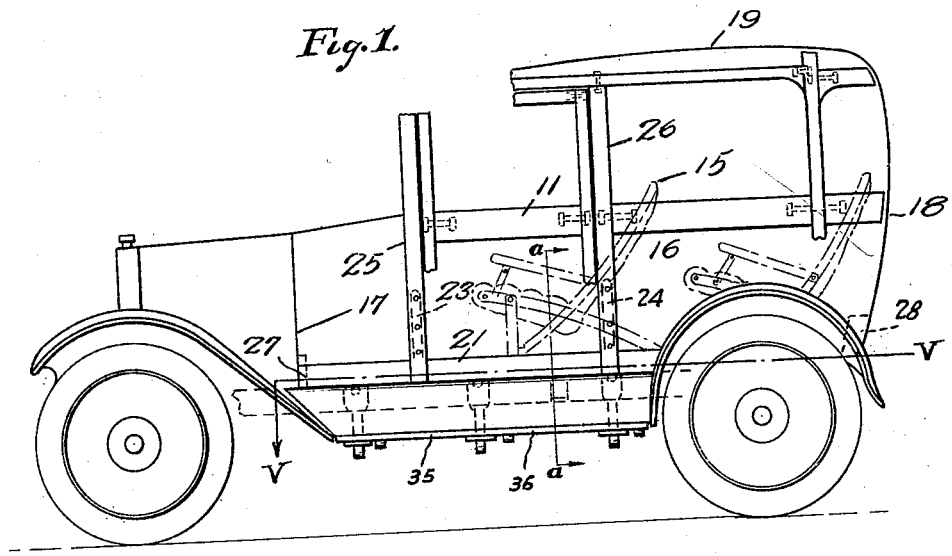
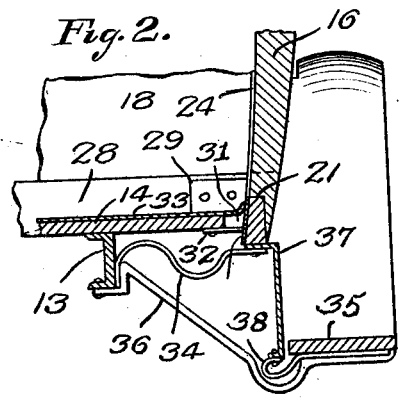
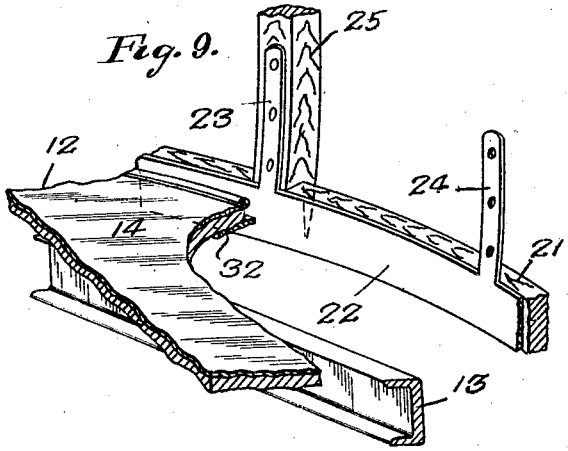
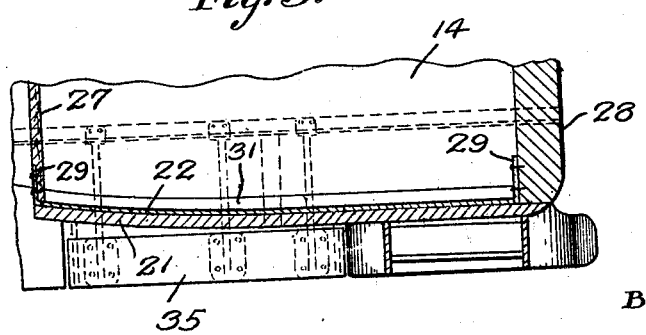
Inventor
George Tasman
By Otto K. Zwirgenberger
his Attorney Dec. 13, 1932. G. TASMAN 1,890,704
VEHICLE BODY
Original Filed Jan. 13, 1925    2 Sheets-Sheet 2
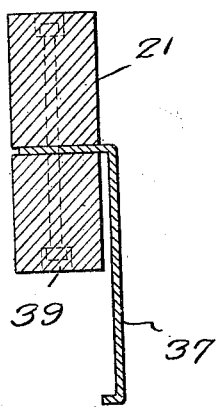
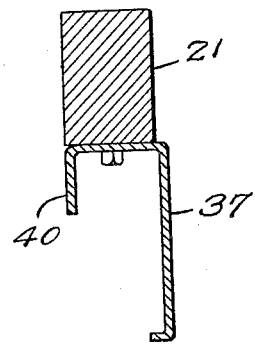
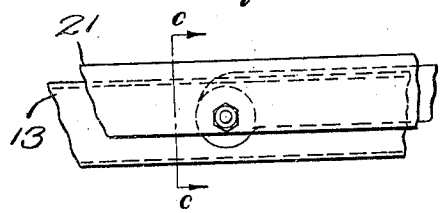
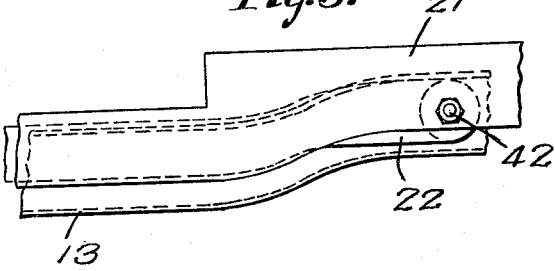
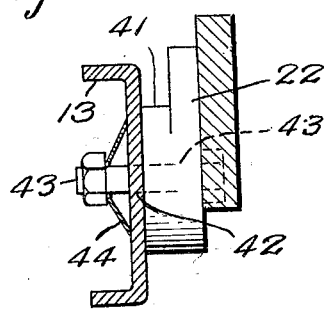
Inventor
George Tasman
By Otto K. Zwingenberger
his Attorney Patented Dec. 13, 1932

1,890,704

UNITED STATES PATENT OFFICE

GEORGE TASMAN, OF BROOKLYN, NEW YORK

VEHICLE BODY

Application filed January 13, 1925, Serial No. 2,073. Renewed January 28, 1929.

This invention relates to vehicles and more particularly to automobiles.

It is an object of this invention to provide a vehicle which shall have greater durability as to its body portion so that the body may maintain its original form and condition throughout the life of the vehicle. In vehicle construction and particularly in automobile construction, the longitudinal beams of the chassis when designed to withstand the strains upon them with a minimum of weight, are sufficiently flexible to bend appreciably, in response to the load and this bending under road conditions produces an oscillatory flexure of the beams themselves. Where the body of the car is rigidly attached to the beams therefor and is compelled to flex with them strains are introduced into the joints of the coach work which rack it to pieces.

It is a more specific object of this invention to provide an automobile in which the strains imposed by the load and by the road conditions are not imparted to the coach work of the body. It is a further object to provide a construction which will produce a firm and lasting body which is adapted to quantity production at a low cost.

In accordance with this invention a weight supporting member is carried directly by the chassis and this weight supporting member preferably has sufficient flexibility to vibrate with the chassis beams under road conditions independent of the body shell. The body shell itself is carried upon the chassis in such a manner as to be rigid thereon at all times but nevertheless to be free to maintain its form independent of the oscillations of the chassis beams or of the weight supporting member. It is desirable to give to the connection between the body and the chassis as reat rigidity as is consistent with the objects above outlined.

To accomplish this result in the preferred embodiments as herein illustrated the body shell comprises side walls and top but without floor or seats, attached to the chassis frame at two parallel horizontal axes, one of which is disposed toward the front of the car and the other being disposed toward the rear. The floor of the car is preferably independent of the body shell and may be supported direct from the longitudinal chassis beams. In this manner, having properly chosen the points of support for the body, the body itself has very little flexing tendency because of its own weight.

The invention accordingly comprises the features of construction, combinations of elements, and arrangements of parts, which will be exemplified in the construction hereinafter set forth and the scope of the application of which will be indicated in the claims.

For a fuller understanding of the nature and objects of the invention reference should be had to the following detailed description, taken in connection with the accompanying drawings, in which:—

Figure 1 is a side elevation of an automobile body embodying my invention and also showing the seats described and claimed in application Serial No. 35,002, filed June 4, 1925, which is a division of this case.

Figure 2 is a fragmentary sectional view on the line a—a of Figure 1, the seats being omitted.

Figure 3 is a fragmentary sectional view on the line V—V of Figure 1.

Figures 4-5 are side elevations of a modified form of connection between the chassis and the body side sill.

Figure 6 is a sectional view on the line c—c of Figure 4.

Figures 7-8 show modified forms of the body side sill and splash apron structure.

Figure 9 is a fragmentary perspective view from the inside of the body showing the relation between certain parts more clearly.

An automobile in accordance with this invention comprises generally a chassis, indicated at 10 and a body shell 11, and a weight supporting member 12. The latter two of these parts are preferably rigidly attached to longitudinal beams or longérons 13 of the chassis frame, but in a special manner to be described.

Any form of weight supporting member may be employed which is capable of withstanding the necessary strains when in use, but it is simpler to provide a floor 14 of such flexibility that it may be supported directly from the chassis longérons 13 and yield to the oscillations of the latter without strain. Seats 15 may be supported in any convenient manner which will transmit the load strains to the chassis independently of the body shell, where, as in the embodiment illustrated, the form of detachable seat shown in my copending application, now Patent No. 1,615,246, is employed, the seats may be supported by the floor 14.

The body shell comprises side walls 16, front wall 17, rear wall 18 and if desired, a top 19 and these parts are preferably so designed as to form of themselves a rigid structure capable of resisting all strains due to road conditions insofar as these may be imposed upon it. These are, however, largely confined to those caused by the weight of the body itself. This body shell is preferably rigidly attached to the chassis to resist swaying either forwardly or laterally, but this connection is such that the body does not follow the vertical flexural oscillations of the longérons. To accomplish this result, as illustrated, the rigid body is attached to the chassis along two horizontal axes, one near the forward end of the body shell and one near the rear.

To give the body shell the desired rigidity the lower sill frame member 21 may be reinforced by a metal plate 22 extending from front to rear along the lower side thereof. This reinforcing plate 22 may have upstanding projections 23 and 34 which are adapted to lie along and be attached to pillars 25 and 26 of the body shell.

In the form of the invention illustrated in Figures 1 and 3 in order to afford a practical means of attaching the body shell to the chassis the body shell is provided with cross pieces 27 and 28 on the front and rear thereof, each of which is adapted to rest upon and be supported by the longérons 13 thus furnishing the only support of the body shell from the chassis. To strengthen this support the reinforcing plate 22 is bent at right angles along a vertical axis at both front and rear to provide ears 29 which may rest against and be attached to the cross pieces 27 and 28. These cross pieces 27 and 28 may rest upon and be rigidly attached to the chassis longérons as they cross, thus furnishing in this form, the only attachment between the body shell and the chassis.

With the above construction it will be clear that the floor and chassis is capable of flexure up and down without flexing the body shell. In order to permit this a clearance 31 is provided between the floor member 14 and the side wall 16 of the body shell sufficient to permit the movement of the parts without any danger of ever rubbing against each other. An excessive clearance is not required in view of the fact that the chassis and shell are rigidly attached to each other at front and rear so that the only lateral movement possible is due to the slight lateral flexibility of the chassis and of the body itself.

It will be understood that the degree of movement of the floor member relative to the body shell is in itself relatively small being but a small fraction of an inch. It assumes importance only when attempt is made to flex the body shell by that amount.

A flap 32 which may be of leather is attached to the floor member and arranged to bear against the side wall of the body shell to close the latter and prevent a draft from the exterior into the body shell. Similarly the mat 33 which rests upon the floor of the car is preferably wide enough to bear against the side walls of the body shell, furnishing an additional closure to the clearance opening.

A spring 34 extending from the longéron 13 may engage the sill member 21 to dampen and control lateral oscillations of the sill member with regard to the floor.

It is desirable to support the running board 35 direct from the chassis so that the mounting and dismounting of passengers does not itself impose a strain upon the body shell. To accomplish this result there is provided a bracket 36 attached to and extending downward from the longéron 13 (see Figure 2) which bracket is sufficiently strong and rigid to take the strain imposed upon it by the running board. A splash apron 37 may be attached to extend downwardly from the sill frame member 21 but it is preferably independent of the running board. To this end a spring member 38 is attached to the running board 35 and to the lower end of the splash apron 37 to permit the relative vertical movement but to restrain the splash apron from striking the edge of the running board.

In Figures 7 and 8 is illustrated two modifications of the construction in which additional reinforcement is provided for the sill member 21 to afford extra strength at the doors. In the form illustrated in Figure 7 an auxiliary wooden member 39 is provided below the horizontal portion of the splash apron and this auxiliary member is bolted direct to the sill. In the form illustrated in Figure 8 the splash apron is provided with an auxiliary downwardly extending flange 40 giving to the splash apron itself the strength of a channel member.

In the modification illustrated in Figures 4, 5 and 6 a different form of connection is provided between the body and the chassis in that the reinforcing plate 22 is provided with a boss 41 extending inwardly to the web 42 of the channel shaped longérons and a bolt 43 extends through the reinforcing plate, the bolts and the web to hold the parts together. A spring washer 44 may be employed if desired. It will be understood that one such bolt 43 is employed on each side of the body at the front and one such bolt is employed on each side at the back, the front bolts being in alinement with each other and the back bolts being in alinement with each other so that the body is in effect supported along two parallel axes.

This embodiment of the invention has the advantage that the points of support for the body shell may be spaced inwardly from the ends of the body shell so that each if desired may be substantially under the center of gravity of the half of the body shell it is intended to support. This method of support, therefore, possesses the distinctive advantage that it minimizes the strains imposed upon the body by its own weight.

It will be observed that in both forms of the invention herein illustrated the body is rigidly held to the chassis longérons and is incapable of bending with respect thereto either forwardly or laterally. Also it is incapable of any up and down movement with regard to the chassis frame except that caused by the flexure of the chasis frame itself. There is, therefore, no form of motion to which the body is subjected which can attain any periodic oscillation or vibration. The body is, therefore, held with the same rigidity as though it were supported on a completely inflexible chassis whereas the chassis can be designed for minimum weight to give it the necessary strength because it does not have to resist flexure on account of the body.

It results also from the above construction that the body may be designed for quantity production utilizing machine operations to the maximum since practically speaking it is not subjected to any strains tending to rack it to pieces.

It is thus possible to construct an automobile cheaply and efficiently and at the same time have the coach work withstand road usage commensurately with the life of the chassis.

Since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the general and specific features of the invention herein described, and all statements of the scope of the invention which, as a matter of language, might be said to fall therebetween.

What I claim is:

1. In an automobile, the combination with a chassis frame having a floor whose longitudinal edges overhang the chassis frame, a reinforcing plate, longitudinal body sides mounted upon the plate, said plate being spaced from and substantially parallel to the longitudinal edges of the floor and being secured at its ends to the said chassis frame and on the outside thereof.

2. In an automobile, the combination with a chassis frame having a floor whose longitudinal edges overhang the chassis frame, a reinforcing plate, longitudinal body sides mounted upon the plate, said plate being spaced from and substantially parallel to the longitudinal edges of the floor and being movably secured at its ends to the said chassis frame and on the outside thereof.

3. In an automobile comprising a chassis having longitudinal beams, in combination a body shell, a floor and seats supported directly by the chassis and otherwise independent of the body shell for support, said shell having transverse front and rear beams, positive connections between each of said transverse beams and each of said longitudinal beams of said body shell and said chassis, said body shell being otherwise independent of the chassis frame, said positive connections being such as to permit flexing of the chassis independent of the body shell, but to prevent other relative movement between the chassis and the body shell.

4. In an automobile comprising a chassis having longitudinal beams, in combination a body shell, a floor, and seats supported directly by the chassis and otherwise independent of the body shell for support, said shell having transverse front and rear beams, positive connections between each of said transverse beams and each of said longitudinal beams of said body shell and said chassis, said body shell being otherwise independent of the chassis frame, said positive connections being such as to permit flexing of the chassis independent of the body shell, but to prevent other relative movement between the chassis and the body shell, said body shell having a doorway therein, and having a sill at the bottom of said doorway and a reenforcement along said body shell at said sill.

5. In an automobile comprising a chassis having longitudinal beams, in combination a body shell, a floor and seats supported directly by the chassis and otherwise independent of the body shell for support, said shell having transverse front and rear beams, positive connections between each of said transverse beams and each of said longitudinal beams of said body shell and said chassis, said body shell being otherwise independent of the chassis frame, said positive connections being such as to permit flexing of the chassis independent of the body shell, but to prevent other relative movement between the chassis and the body shell, brackets extending downwardly from said chassis and a running board attached to said brackets and receiving its sole support direct from said chassis frame independent of the body shell.

6. In an automobile comprising a chassis having longitudinal beams, in combination a body shell, a floor and seats supported directly by the chassis and otherwise independent of the body shell for support, said shell having transverse front and rear beams, positive connections between each of said transverse beams and each of said longitudinal beams of said body shell and said chassis, said body shell being otherwise independent of the chassis frame, said positive connections being such as to permit flexing of the chassis independent of the body shell, but to prevent other relative movement between the chassis and the body shell, brackets extending downwardly from said chassis and a running board attached to said brackets and receiving its sole support direct from said chassis frame independent of the body shell and a splash apron depending from the body shell adjacent to the running board, and means for preventing contact between the running board and the splash apron comprising a spring rigid for lateral motion but flexible for up and down motion.

7. In an automobile comprising a chassis having longitudinal beams, in combination a body shell, a floor and seats supported directly by the chassis and otherwise independent of the body shell for support, said shell having transverse front and rear beams, positive connections between each of said transverse beams and each of said longitudinal beams of said body shell and said chassis, said body shell being otherwise independent of the chassis frame, said positive connections being such as to permit flexing of the chassis independent of the body shell, but to prevent other relative movement between the chassis and the body shell, said body shell being independent of said floor, said seats and said chassis, except at the points of connection, and flexible members extending from said chassis to the sides of said body shell for preventing lateral motion between them while permitting a relative up and down motion between them.

8. In an automobile comprising a chassis having longitudinal beams, in combination a body shell, a floor and seats supported directly by the chassis and otherwise independent of the body shell for support, said shell having transverse front and rear beams, positive connections between each of said transverse beams and each of said longitudinal beams of said body shell and said chassis, said body shell being otherwise independent of the chassis frame, said positive connections being such as to permit flexing of the chassis independent of the body shell, but to prevent other relative movement between the chassis and the body shell, said body shell being independent of said floor said seats and said chassis, except at the points of connection, and flexible members extending from said chassis to the sides of said body shell for preventing lateral motion between them while permitting a relative up and down motion between them, a running board receiving its sole support direct from said chassis, independent of the body shell.

9. In an automobile comprising a chassis having longitudinal beams, in combination a body shell, a floor, and seats supported directly by the chassis and otherwise independent of the body shell for support, said shell having transverse front and rear beams, positive connections between each of said transverse beams and each of said longitudinal beams of said body shell and said chassis, said body shell being otherwise independent of the chassis frame, said positive connections being such as to permit flexing of the chassis independent of the body shell, but to prevent other relative movement between the chassis and the body shell, said body shell having side doors therein provided with lower sills and a splash apron extending downwardly from said body shell and serving to reenforce the body shell at the sills, independent of the chassis.

GEORGE TASMAN.